(12) United States Patent
Kats et al.

(10) Patent No.: US 11,188,229 B2
(45) Date of Patent: Nov. 30, 2021

(54) ADAPTIVE STORAGE RECLAMATION

(71) Applicant: Hitachi Vantara LLC, Santa Clara, CA (US)

(72) Inventors: Yury Kats, Belmont, MA (US); Sowmya Manjanatha, Westford, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 86 days.

(21) Appl. No.: 15/742,558

(22) PCT Filed: Sep. 25, 2015

(86) PCT No.: PCT/US2015/052146
§ 371 (c)(1),
(2) Date: Jan. 8, 2018

(87) PCT Pub. No.: WO2017/052571
PCT Pub. Date: Mar. 30, 2017

(65) Prior Publication Data
US 2018/0203612 A1    Jul. 19, 2018

(51) Int. Cl.
*G06F 3/06* (2006.01)
*G06F 12/02* (2006.01)

(52) U.S. Cl.
CPC .......... *G06F 3/0608* (2013.01); *G06F 3/0605* (2013.01); *G06F 3/067* (2013.01);
(Continued)

(58) Field of Classification Search
CPC ........ G06F 3/0608; G06F 3/064; G06F 3/067; G06F 3/0689; G06F 12/0276; G06F 12/0253; G06F 12/0261; G06F 12/0269
See application file for complete search history.

(56) References Cited

U.S. PATENT DOCUMENTS

| | | | | |
|---|---|---|---|---|
| 6,065,020 A | * | 5/2000 | Dussud | ............... G06F 12/0253 |
| 8,364,918 B1 | * | 1/2013 | Smith | ................. G06F 12/0246 |
| | | | | 711/159 |

(Continued)

FOREIGN PATENT DOCUMENTS

| | | |
|---|---|---|
| EP | 2 624 136 A2 | 8/2013 |
| WO | 2007/019198 A2 | 2/2007 |

OTHER PUBLICATIONS

International Search Report of PCT/US2015/052146 dated Dec. 28, 2015.

(Continued)

*Primary Examiner* — Andrew J Cheong
(74) *Attorney, Agent, or Firm* — Mattingly & Malur, PC

(57) ABSTRACT

In some examples, a system may include at least one class of storage that is configured for having freed storage space reclaimed to enable reuse of the freed storage space. For instance, the system may determine whether a volume corresponding to the at least one class of storage is used to store system data or user data. If the volume is used to store user data, then the system may determine whether any of the user data has been deleted from the volume. If data has been deleted from the volume, the system may determine whether an available capacity of the volume is less than a remaining capacity threshold before performing reclamation on the at least one storage device corresponding to the volume. Alternatively, if the volume is used to store system data, the system may perform reclamation based on an elapsed period of time since the last reclamation.

16 Claims, 9 Drawing Sheets

(52) U.S. Cl.
CPC .......... *G06F 3/0652* (2013.01); *G06F 3/0665* (2013.01); *G06F 12/0276* (2013.01); *G06F 3/0689* (2013.01)

(56) References Cited

U.S. PATENT DOCUMENTS

| | | |
|---|---|---|
| 8,504,524 B1 | 8/2013 | Chatterjee et al. |
| 8,635,422 B1 | 1/2014 | Kaliannan et al. |
| 2003/0065873 A1 | 4/2003 | Collins et al. |
| 2007/0033324 A1* | 2/2007 | Sinclair ................ G06F 3/0605 711/103 |
| 2009/0125572 A1* | 5/2009 | Cannon ................ G06F 16/181 |
| 2010/0070734 A1 | 3/2010 | Agombar et al. |
| 2011/0219049 A1 | 9/2011 | Zaitsev |
| 2012/0124306 A1* | 5/2012 | Abercrombie ...... G06F 11/1461 711/162 |
| 2012/0198443 A1 | 8/2012 | Tatavarty |
| 2012/0331242 A1* | 12/2012 | Shaikh ................ G06F 9/45533 711/154 |
| 2015/0058381 A1* | 2/2015 | Wilhelmsson ...... G06F 9/45533 707/813 |
| 2015/0347309 A1* | 12/2015 | McIntyre ............ G06F 12/0864 711/135 |
| 2016/0011815 A1* | 1/2016 | Klein .................... G06F 3/0644 714/6.12 |
| 2016/0246713 A1* | 8/2016 | Choi .................... G06F 12/0269 |
| 2019/0042405 A1* | 2/2019 | Boyle ................ G06F 12/0253 |

OTHER PUBLICATIONS

Extended European Search Report received in corresponding European Application No. 15904910.5 dated Mar. 22, 2019.
Communication Pursuant to Article 94(3) EPC received in corresponding European Application No. 15 904 910.5 dated Feb. 24, 2020.

* cited by examiner

| Volume ID (502) | Storage Class (504) | Data Characteristics (506) | Available Capacity (508) |
|---|---|---|---|
| Volume 1 | Array Thin Provisioning | System Data (Database) | 40% |
| Volume 2 | DAS Thin Provisioning | User Data | 90% |
| Volume 3 | Solid State Device | System Data (Operating System) | 30% |
| Volume 4 | Solid State Device | User Data | 10% |
| ... | ... | ... | ... |

Storage Profile Table

ADAPTIVE STORAGE RECLAMATION

TECHNICAL FIELD

This disclosure relates to the technical field of storage systems, including reclaiming storage capacity in a storage system.

BACKGROUND

Some types of storage require reclamation of storage following deletion of data before new data can be written to the storage. For example, reclamation may involve overwriting an area of storage with a consistent pattern, such as all zeros, or the like. As one example, solid-state drives (SSDs) typically require that old data be overwritten before new data can be stored in its place. Further SSDs may wear out over time as each cell in a flash memory bank has a limited number of write and erase cycles, so unnecessary reclamation may be undesirable.

As another example, thin provisioned storage, such as may be employed using hard disk drives (HDDs) and/or SSDs, as well as other storage arrays with dynamic provisioning/tiering features, may not automatically free storage space when data is deleted. Accordingly, this class of storage also may employ storage space reclamation before the storage space can be reused.

Reclamation is an expensive operation in terms of time consumed by the reclamation process and the performance impact that the reclamation process imposes on the rest of the storage system. Typical approaches to reclamation of storage space on SSDs and thin provisioned storages may include "reclaim after each operation" or "reclaim periodically". While both of these conventional approaches ensure that space is reclaimed, these approaches may have a significant impact on the performance of the storage system.

SUMMARY

Some implementations include techniques and arrangements for an adaptively reclaiming storage space to minimize the performance impact while still ensuring that storage space is reclaimed for optimal system operation. For instance, the system may store user data separately from system data, such as in separate logical volumes. The system may include at least one class of storage that is configured for having freed storage space reclaimed to enable reuse of the freed storage space. The system may determine whether a volume corresponding to the at least one class of storage is used to store system data or user data. If the volume is used to store user data, then the system may determine whether any of the user data has been deleted from the volume. If data has been deleted from the volume, the system may determine whether an available capacity of the volume is less than a remaining capacity threshold before performing reclamation on the storage corresponding to the volume. If the available capacity of the volume is more than the remaining capacity threshold, reclamation is not performed. Alternatively, if the volume is used to store system data, the system may perform reclamation based on an elapsed period of time since the last time reclamation was performed on the volume or other volumes storing system data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates an example storage profile table according to some implementations.

DESCRIPTION OF THE EMBODIMENTS

Figure 1:
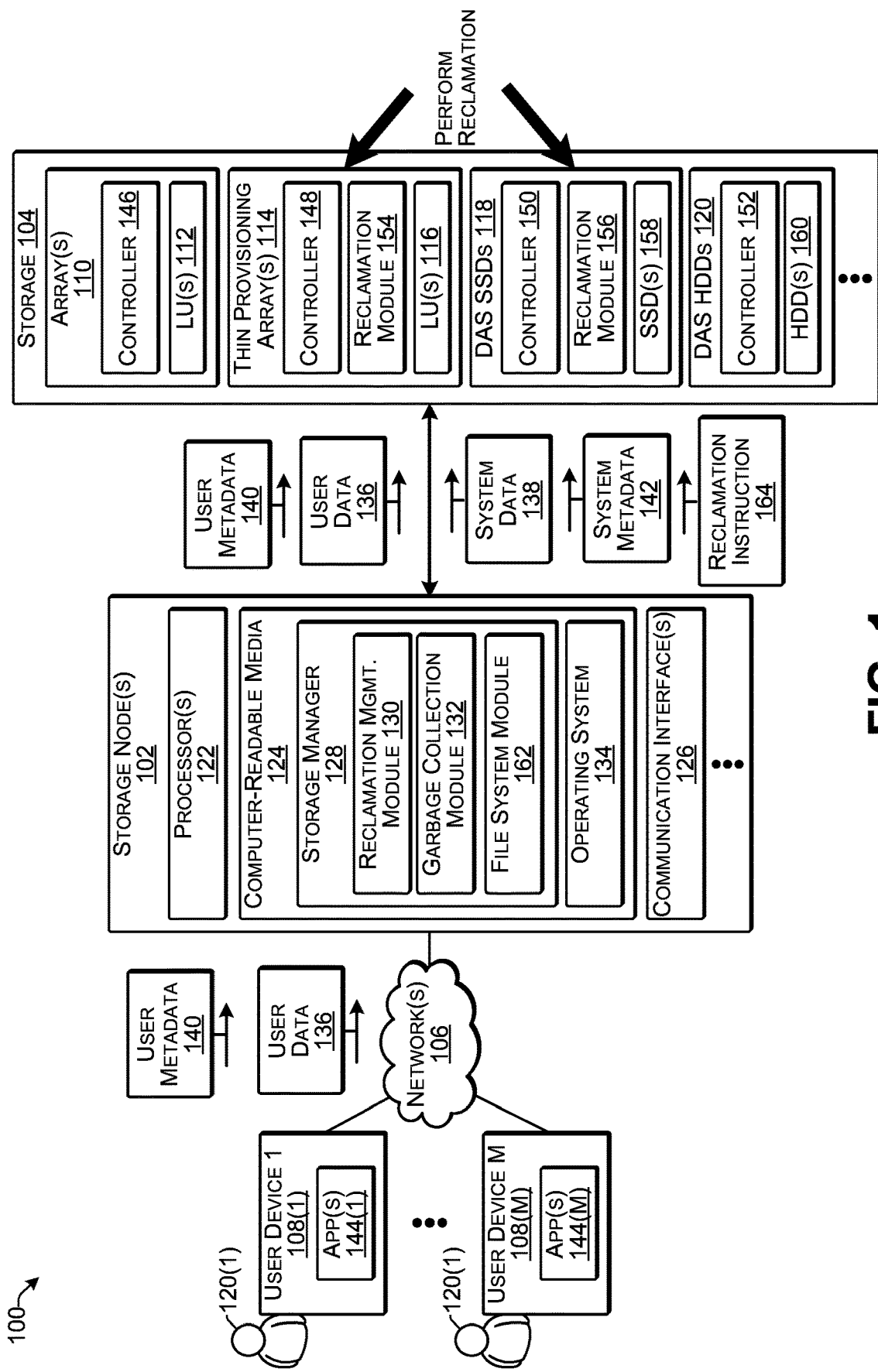
FIG. 1 illustrates an example architecture of a system configured to perform storage reclamation according to some implementations.

Some implementations herein are directed to techniques and arrangements for intelligent and adaptive reclamation of storage space. As one example, a storage manager may actively manage its own storage and may control where information is stored and what operations are carried out. The storage manager may further include logic for selecting portions of storage on which to perform reclamation. The storage manager may further determine times for performing reclamation, such as at times when the impact of reclamation may be minimal and/or the reclamation may provide optimal benefit. For instance, implementations herein may ensure reclamation does not take place when reclamation is not really needed, that reclamation takes place when the overall system state is best suited for reclamation, and that reclamation takes place when there is an actual benefit to be gained from reclamation.

In some examples, the storage manager may manage multiple different classes of storage. For example, the storage manager may access various different classes of storage, such as direct attached storage (DAS), storage arrays, and/or hybrid cloud storage. Some of those storage classes may be "thin provisioned", meaning that freed up space is reclaimed after data is deleted to enable the freed storage space to be reused. Storage classes that are subject to reclamation processing include solid state drives (SSDs) and thin provisioned storage arrays with dynamic provisioning, and, in some cases, tiering.

Further, reclamation in the examples herein may include any technique for restoring freed up storage space to a condition for reuse. As one example, reclamation may include overwriting the freed storage space on an SSD with a predetermined pattern, such as by writing all zero bits (or all one bits, or any other known pattern) to the storage area being reclaimed. As another example, with respect to reclamation in a thin provisioning array that is composed of HDDs and/or SSDs, a reclamation request is sent to the thin provisioning array so that a physical storage area of the HDDs and/or SSDs corresponding to the reclamation request is released from allocation to a virtual storage area of the thin provisioning array to free up the released real storage area. In some examples, the released physical storage area of the HDDs and/or SSDs may undergo a further reclamation process conducted internally by the thin provisioning array to restore the freed storage space to a condition of reuse. For example, if not already done so, reclamation may include overwriting the freed storage space on an SSD with a predetermined pattern, such as by writing all zero bits (or other known pattern) to the storage area being reclaimed by the thin provisioning array.

In addition, in some examples, the storage manager may manage and store different categories of data on the storage. For instance, two categories of data according to some examples herein include user data and system data. User data managed by the storage manager may include files or other objects generated or otherwise received from user devices, such as from applications on a user device. Accordingly, user data may include data not created by the storage manager or other system software. User data may also include custom metadata for the user data, such as file names and other file information, user generated object information, or the like. System data may include system generated data such as system logs, transaction logs, indexes, internal databases, system generated data structures, operating system data, lists of users, and other data generated by system modules and components. These two data categories may have very different update and deletion profiles. For example, while user data may change infrequently, the system data may change continually.

The storage manager may manage both the storage that it is configured to access and the data stored by the storage manager on the storage. This means that the storage manager has knowledge of what category of data is stored on which classes of storage at any given time, along with the available capacity on each storage device or logical unit in each class of storage. Accordingly, the storage manager may be configured to execute one or more reclamation algorithms that can be applied to perform reclamation based in part on the data profile, the storage class, and other considerations. In implementations herein, the storage manager may treat storage volumes storing user data differently from storage volumes storing system data when executing a reclamation process.

Furthermore, because the storage manager manages all objects under its control, the storage manager knows what operations are being performed on those objects by users as well as by internal system services. Consequently, the storage manager knows when data is physically deleted and from what storage devices. Based on this knowledge, the storage manager may apply selective reclamation algorithms, such as for only reclaiming storage space when physical deletions have taken place, free space is sparse, and the overall system is not encumbered by a large number of other operations.

In some examples, the storage manager may apportion at least some of the storage into logical volumes. For instance, volumes may include logical units (LUs) identified by logical unit numbers (LUNs) which may be provided from an array, from directly attached storage, or from cloud "buckets". For each volume the storage manager knows what the class of storage is and what the category of data stored on the storage is, including what individual objects are stored on each volume. As one example, the storage manager may maintain a data structure, such as a table, including at least some of this information, and may refer to the data structure when determining whether to perform reclamation.

In implementations herein, system data may change frequently. Accordingly, storage manager may perform reclamation regularly and periodically on the volumes where system data is stored. For instance, the storage manager may be configured to reclaim storage space on volumes hosting system data at configurable specified time intervals (e.g., once an hour, twice a day, once a day, etc.). In some cases, the interval between reclamations may be automatically adjusted by the storage manager based on storage metrics collected from the volumes, such as the amount of storage space reclaimed during one or more past reclamation processings.

On the other hand, user data typically does not change frequently as compared to system data. Accordingly, the volumes where this category of data is stored may only go through reclamation processing when some data has been deleted from a volume and the free space in the volume is sparse. Since the storage manager manages data lifecycles on the data, the storage manager has information for making a determination as to which volumes to subject to reclamation and the timing of such reclamation. For example, reclamation may typically be performed at some point in time subsequent to deletion of data from a volume. The storage manager may perform deletions in batches, such as through execution of an internal service called "garbage collection". For example, a garbage collection module may run periodically, e.g., based on a defined schedule. Subsequently, when the garbage collection module completes execution, the system may have deleted data from storage, e.g., based on deletion from a file system. The storage manager may then determine which volumes on which to perform the reclamation process based on one or more parameters, such as amount of utilization of the volume, whether there were any deletions of data on the volume, and overall load on the system.

In some examples, the storage manager may avoid unnecessary reclamation invocations by not reclaiming any space on volumes unless the volumes have a remaining available capacity that is lower than a configurable threshold amount, such as less than 50% remaining capacity available for use, less than 40% remaining capacity available, etc. Further, reclamation is not performed on volumes from which no data has been deleted since the last reclamation invocation. In addition, the storage manager may adapt the reclamation workflow to the overall system load, such as by timing reclamation for periods that typically have lower user usage than other periods. In addition, in some cases, the storage manager may invoke reclamation in the background so that real-time user ingests are not affected.

For discussion purposes, some example implementations are described in the environment of storage system having one or more storage nodes. However, implementations herein are not limited to the particular examples provided, and may be extended to other types of storage systems, other execution environments, other system architectures, and so forth, as will be apparent to those of skill in the art in light of the disclosure herein.

FIG. 1 illustrates an example architecture of a system 100 configured to perform storage reclamation according to some implementations. The system 100 includes one or more computing devices as storage node(s) 102 that are able to communicate with or otherwise coupled to storage 104.

Further, the storage node 102 may be able to communicate over one or more networks 106 with one or more user devices 108, such as user devices 108(1), . . . , 108(M).

The storage 104 may include one or more of various different classes of storage. In the illustrated example, storage 104 may include one or more arrays 110. For example, the array 110 may include a plurality of hard disk drives (HDDs) or other storage devices configured as one or more logical units (LUs) 112. Each LU may correspond to at least a portion of one or more physical storage devices, such as may be arranged in a RAID (redundant array of independent disks) configuration or other storage configuration, and which in some cases may be part of a Storage Area Network (SAN) or other array configuration. In the array 110, a certain amount of storage capacity is preallocated to each LU 112 and the array 110 typically does not require reclamation. However, if SSDs are included in the array 110, then reclamation may be performed on the SSDs in the array 110 following deletion of data from a corresponding LU 112.

In addition, the storage 104 may include one or more thin provisioning arrays 114. A thin provisioning array may include a plurality of LUs 116 that are thin provisioned. In some implementations, thin provisioning of storage enables optimizing utilization of available storage by relying on on-demand allocation of blocks of data versus the traditional method of allocating all the blocks up front. This technique helps avoid the poor utilization rates that may occur in the traditional storage allocation. For example, the system may monitor the storage used by each thin provisioning array 114 and may employ dynamic provisioning of the LUs. Further, when data has been deleted from a volume provided by a thin-provisioned array, the allocated storage may be reclaimed to be returned to a storage pool provided by the thin-provisioned array.

As another example, as an alternative, or in addition to thin provisioning, the array 114 may offer tiered storage such as by offering multiple storage media types, such as SSDs and HDDs for delivering different performance levels. For example, tiering may be applied, such as for providing a first tier of data that is expected to be accessed more frequently and a second tier for data that is expected to be accessed less frequently. Faster devices, such as SSDs, may be used for the first tier and HDDs may be used for the second tier. When data is deleted from a volume that corresponds to SSDs used for one of the tiers, then freed storage space on the SSDs is reclaimed before being reused.

In addition, in some examples, the storage 104 may include direct attached storage (DAS). DAS is digital storage directly attached to the computer that accesses the storage, as opposed to storage accessed over a computer network. As one example, the storage 104 may include one or more SSDs 118 as DAS. As another example, the storage 104 may include one or more HDDs 120 as DAS. The DAS SSDs 118 are subject to reclamation following deletion of data from a storage location on the DAS SSDs 118. For example, SSDs typically require reclamation before storage capacity can be reused. On the other hand, HDDs 120 typically do not require reclamation, and freed up storage locations may merely be overwritten with new data rather than first being reclaimed. Furthermore, while several classes of storage have been discussed in this example, implementations herein are not limited to the examples shown, but may be extended to other classes of storage that employ reclamation for enabling reuse of freed storage space, as will be apparent to those of skill in the art having the benefit of the disclosure herein.

In some examples, the storage node 102 may include one or more servers or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used. In the illustrated example, the node 102 includes, or may have associated therewith, one or more processors 122, one or more computer-readable media 204, and one or more communication interfaces 126.

Each processor 122 may be a single processing unit or a number of processing units, and may include single or multiple computing units or multiple processing cores. The processor(s) 122 can be implemented as one or more central processing units, microprocessors, microcomputers, microcontrollers, digital signal processors, state machines, logic circuitries, and/or any devices that manipulate signals based on operational instructions. For instance, the processor(s) 122 may be one or more hardware processors and/or logic circuits of any suitable type specifically programmed or configured to execute the algorithms and processes described herein. The processor(s) 122 can be configured to fetch and execute computer-readable instructions stored in the computer-readable media 124, which can program the processor(s) 122 to perform the functions described herein.

In some cases, the computer-readable media 124 may be at the same location as the node 102, while in other examples, the computer-readable media 124 may be remote from the node 102. For instance, in some cases, the computer-readable media may include a portion of the storage 104, such as the DAS SSDs 118 and/or the DAS HDDs 120. The computer-readable media 124 may include volatile and nonvolatile memory and/or removable and non-removable media implemented in any type of technology for storage of information, such as computer-readable instructions, data structures, program modules, or other data. For example, the computer-readable media 124 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the node 102, the computer-readable media 124 may be a tangible non-transitory medium to the extent that, when mentioned, non-transitory computer-readable media exclude media such as energy, carrier signals, electromagnetic waves, and/or signals per se.

The computer-readable media 124 may be used to store any number of functional components that are executable by the processor(s) 122. In many implementations, these functional components comprise instructions or programs that are executable by the processor(s) 122 and that, when executed, specifically program the processor(s) 122 to perform the actions attributed herein to the node 102. Functional components stored in the computer-readable media 124 may include storage manager 128, which may be one or more computer programs, applications, executable code, or portions thereof, and which may provide the storage management algorithms discussed herein. In addition, the storage manager 128 may include, or may employ a reclamation management module 130 that may provide one or more reclamation management algorithms described herein, such as described below with respect to FIGS. 7-9. In addition, the storage manager 128 may include a garbage collection module 132, functions of which are discussed additionally below. Additional functional components stored in the computer-readable media 124 may include an operating system 134 for controlling and managing various functions of the node 102. As one example, these functional components may be stored in a storage portion of the computer-readable media 124, loaded into a local memory portion of the computer-readable media 124, and executed by the one or more processors 122.

In addition, the computer-readable media 124 may store data and data structures used for performing the functions and services described herein. For example, the computer-readable media 124 may store a storage profile table, as discussed below with respect to FIG. 6. The node 102 may also include or maintain other functional components and data, which may include programs, drivers, etc., and the data used or generated by the functional components. Further, the node 102 may include many other logical, programmatic, and physical components, of which those described above are merely examples that are related to the discussion herein.

The communication interface(s) 126 may include one or more interfaces and hardware components for enabling communication with various other devices, such as over the network(s) 106 and/or the storage 104. Thus, the communication interfaces 126 may include, or may couple to, one or more ports that provide connection to the storage 104, and one or more ports that provide connection to the user devices 108. For example, communication interface(s) 126 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Each user device 108 may be any suitable type of computing device such as a desktop, laptop, tablet computing device, mobile device, smart phone, wearable device, or any other suitable type of computing device. In some cases, the user devices 108 may include hardware configurations similar to that described for the node 102, but with different data and functional components to enable them to perform the various functions discussed herein. Users 120(1), . . . , 120(M) may be associated with respective user devices 108(1), . . . , 108(M), such as through a user account, user login credentials, or the like. In some examples, the user devices 108 may access the node 102 via an application server (not shown in FIG. 1), while in other examples, the user devices 108 may access the node 102 directly. Furthermore, the user devices 108 may be able to communicate with the node 102 through the one or more networks 106, through separate networks, or through any other suitable type of communication connection. Numerous other variations will be apparent to those of skill in the art having the benefit of the disclosure herein.

The one or more networks 106 can include any suitable network, including a wide area network, such as the Internet; a local area network, such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the node 102 and user devices 108 are able to communicate over the one or more networks 106 using wired or wireless connections, and combinations thereof.

As mentioned above, the storage manager 128 may manage different categories of data, such as user data 136 and system data 138. In some examples, user data 136 may include user metadata 140 that is managed as user data 136. For example, the user metadata 140 may include file name, file size, as well as custom metadata, which may depend at least in part on the type of file. For instance, an X-ray image file may include custom metadata such as the doctor's name, contact information, date of the X-ray, and so forth. User metadata 140 may be stored with other user data 136, and therefore can be categorized the same as user data 136 according to implementations herein.

System data 138 may include system logs, transaction logs, indexes, internal databases, system generated data structures, operating system data, lists of users, and other data generated by system modules and components. Further, system data 138 may include system metadata 142 that is managed as system data 138. System metadata 142 may be stored with other system data 138 and can be categorized the same as system data 138 according to implementations herein. When the user data 136 and the system data 138 are stored to storage that employs reclamation, such as the thin provisioning array 114 or the DAS SSDs 118, different reclamation algorithms are employed depending on whether the storage space being freed up was used for storing user data 136 or system data 138.

As mentioned above user data 138, including user metadata 140 may be received from the user device 108, such as from one or more applications 144 executing on the user device. For example, one or more first user applications 144(1) may execute on the first user device 108(1), one or more Mth user applications 144(M) may execute on the Mth user device 108(M), and so forth. The user applications 144 may generate user data and/or may save the user data to the storage 104, such as by sending user data to the storage node 102. Further, in some examples, user data 136 may include content items, such as images, documents, emails, video recordings, audio recordings, and the like. When the storage manager 128 initially receives the user data 136 from a user device 108, the storage manager 128 may categorize the received data as user data 136, and may store the user data 136 on a volume designated for user data. Thus, if the user data 136 is subsequently manipulated by the storage manager, moved to another storage location, or the like, the user data 136 remains categorized as user data 136. Similarly, system data 138 may remain categorized as system data 138 despite being moved from one location to another in the storage 104. According to some examples herein, user data 136 may be stored on volumes designated for user data and system data 138 may be stored separately on volumes designated for system data.

As one example, a storage that is used to store system data 138 may have reclamation performed on a periodic basis, such as according to a schedule selected by an administrator or other user. In some examples, the storage manager 128 may adjust the schedule based on how much space is reclaimed during each reclamation process.

On the other hand, storage that is used to store user data 136 may have reclamation performed in response to one or more conditions being met. In some examples, a remaining capacity threshold may be set for particular storage volumes, devices, or the like. For instance, if a storage volume has had data deleted since a last reclamation process, and if the remaining available capacity of the volume is less than a remaining capacity threshold amount, reclamation may be performed on the storage device corresponding to the volume. Further, in some cases, the storage manager 128 may also take into consideration historic system usage patterns for timing reclamation for periods of lower user activity.

In some examples, one or more controllers may be associated with the storage 104. As illustrated in the example of FIG. 1, a controller 146 may be associated with the array 110, a controller 148 may be associated with the thin provisioning array 114, a controller 150 may be associated with the DAS SSDs 118, and a controller 152 may be associated with the DAS HDDs 120. For instance, the controller 146 may control the array 110, such as for configuring the array 110 in a RAID configuration, presenting the LUs 112 to the storage manager 128, managing data stored on the underlying physical devices, and so forth. Similarly, the controller 148 may control the thin provisioning array 114, such as for providing thin provisioning functionality, managing data on the underlying physical devices, presenting the LUs 116, as well as for performing reclamation. For instance, the controller 148 may execute a reclamation module 154 that may be part of a thin provisioning software stack used by the array controller 148 for providing thin provisioned storage to the storage manager 128.

Additionally, the DAS SSDs 118 may include a controller 150 for controlling read and write operations to SSDs 158. A reclamation module 156 executed by the controller 150 may be a driver for the SSDs 158 or other reclamation module that performs reclamation on the SSDs 158. In addition, the controller 152 may control data operations on HDDs 160.

As one example, the storage manager 128 may determine that reclamation is to be performed on storage corresponding to a volume (not shown in FIG. 1) from which data has been deleted. For example, in the case of user data 136, the storage manager 128 may include a file system module 162 that presents a file system to the user devices 108. When a file or other object is indicated to be ready for deletion from the file system, such as by a user deleting the file, or due to expiration of a retention period, the garbage collection module 132 may determine when to delete the corresponding data from a volume, such as based on a retention policy or other considerations, as discussed additionally below. When the data is to be deleted from the volume, the garbage collection module may delete the file or other object from the file system. Subsequently, based on determining that reclamation should be performed on the storage corresponding to the volume from which the data was deleted, the storage manager may send a reclamation instruction 164 to a controller that controls the storage corresponding to the volume. In the illustrated example, suppose that the storage is the thin provisioning array 114. Upon receiving the reclamation instruction 164 from the storage manager 128, the controller 148 associated with the thin provisioning array 114 may execute the reclamation module 154 to reclaim virtual storage capacity corresponding to the area of the volume from which the data was deleted.

Alternatively, in the case of system data 138, garbage collection may not be used in some examples. Instead, the storage manager 128 may delete system data 138 according to one or more system policies, and may perform reclamation periodically. For example, following the elapse of a certain period of time since the last reclamation performed on system data volumes, the storage manager 128 may determine that reclamation is to be performed on storage corresponding to one or more of these system data volumes, as discussed additionally below. To perform reclamation of particular storage corresponding to a particular volume, the storage manager 128 may send a reclamation instruction 164 to the controller associated with the particular storage. In response to receiving the instruction, the controller may perform reclamation on the corresponding storage.

Figure 2:
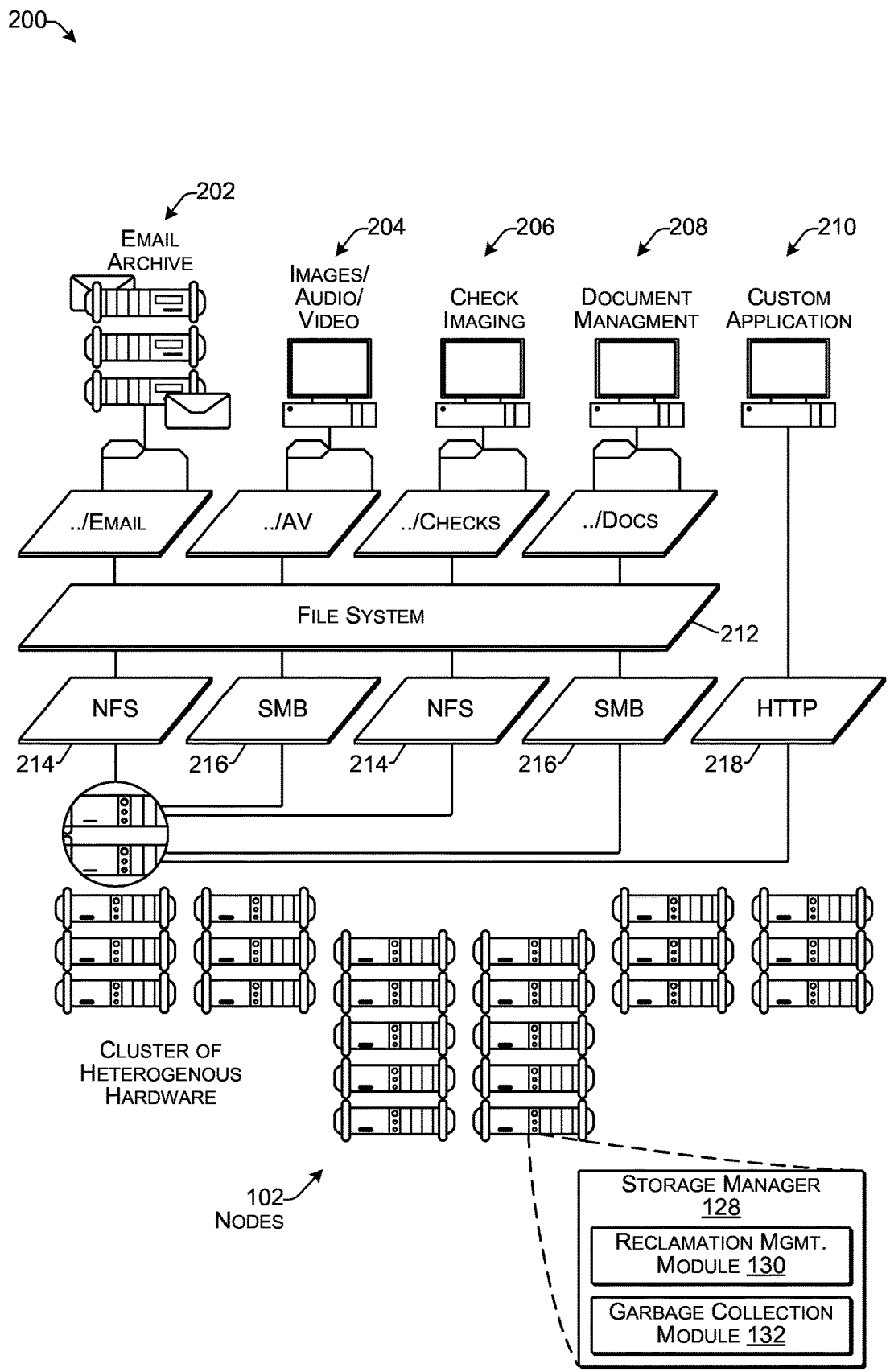
FIG. 2 illustrates an example of a system that may implement at least some portions of the architecture of FIG. 1 according to some implementations.

FIG. 2 illustrates an example of a system 200 that may implement at least some portions of the architecture 100 of FIG. 1 according to some implementations. For instance, in the system 200, a plurality of the nodes 102 may be included in a scalable storage management system in which the system architecture based on a redundant array of independent nodes 102. In some cases, the nodes 102 may comprise different hardware and thus may be considered "heterogeneous". In contrast, the storage manager 128 (and, optionally, the underlying operating system (not shown in FIG. 2) on which that the storage manager 128 executes) may be the same on each node 102. Thus, the software stack (which may include the storage manager 128 and operating system) on each node 102 may be symmetric, whereas the hardware may be heterogeneous.

As one example, some or all of the nodes 102 may include one or more DAS SSDs, as discussed above with respect to FIG. 1, for storing user data and/or system data, and which may be subject to reclamation processing of unused storage. Additionally, or alternatively, as another example, some or all of the nodes 102 may access a thin provisioning array, as discussed above with respect to FIG. 1, for storing user data and/or system data, and which may be subject to reclamation processing of unused storage.

As illustrated in FIG. 2, enterprises may use the system 200 to create long term and reliable storage for many different types of fixed content information such as e-mail archives 202, images, audio, and/or video recordings 204, check images 206, documents 208, and custom applications 210, to name a few examples. These examples are merely illustrative, and do not limit the implementations herein. In addition, the system 200 may include at least one file system 212, which may be shared by the nodes 102 and which may enable various protocols such as network file system (NFS) 214, server message block (SMB) 216, and hypertext transfer protocol (HTTP) 218. High levels of reliability may be achieved by replicating data among the storage nodes 102. Further, as mentioned above, each node 102 may be functionally symmetric with its peers. Thus, because any given node 102 may be able to perform all functions, the failure of any one node 102 has little impact on the overall availability of the system 200.

Figure 3:
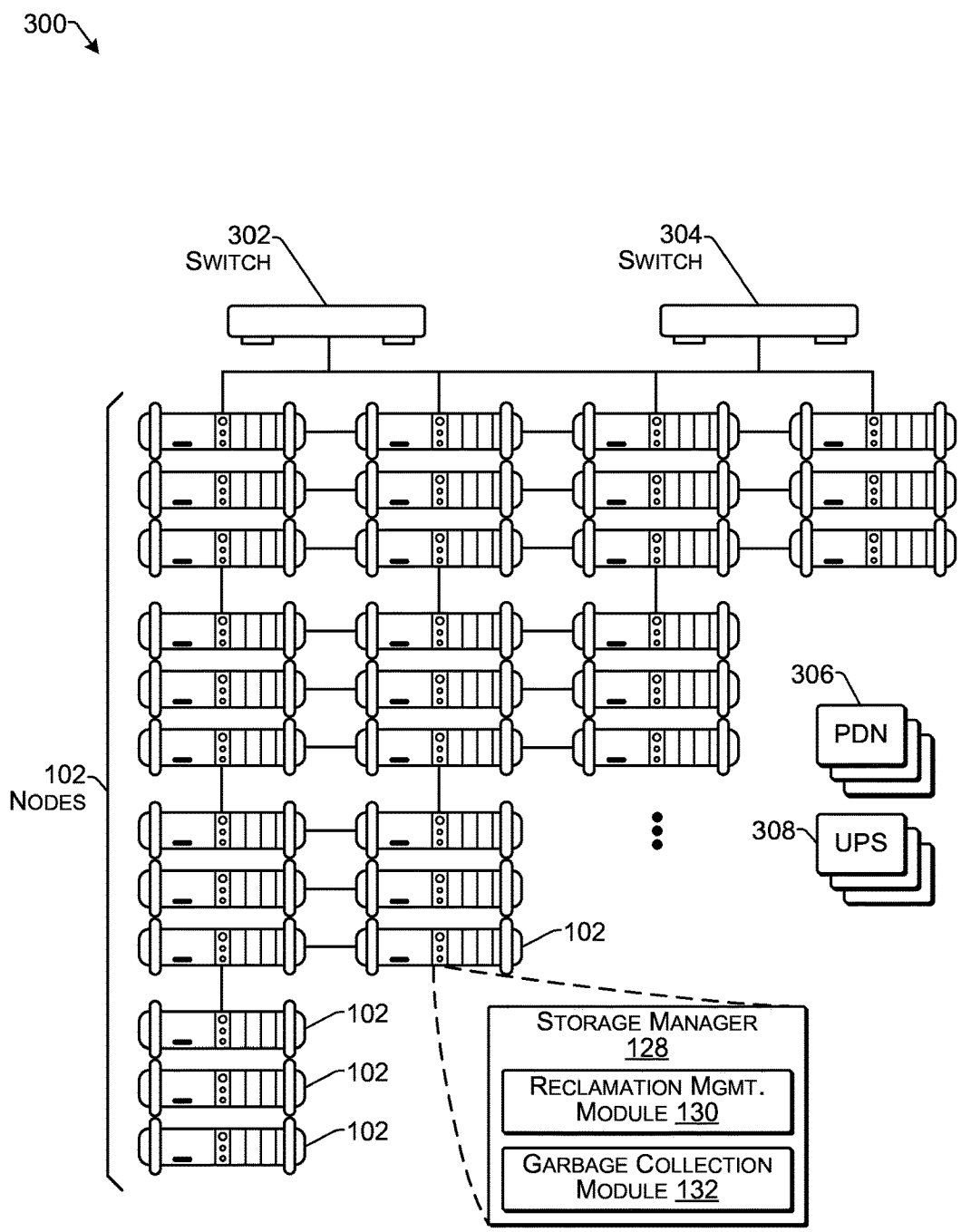
FIG. 3 illustrates an example of a system that may implement at least some portions of the architecture of FIG. 1 according to some implementations.

FIG. 3 illustrates an example of a system 300 that may implement at least some portions of the architecture 100 of FIG. 1 according to some implementations. In some examples, the system 300 may be referred to as a redundant array of independent nodes (RAIN) that are networked together as a cluster. In this example, the storage manager 128 may be, or may be included in, a distributed software application, such as an archive cluster application. The application may capture, preserve, manage, and retrieve digital assets. In the example of FIG. 3, the system 300 is referred to as a cluster. Typically, a cluster is not a single device, but rather a collection of devices including a plurality of the nodes 102. As noted above, nodes 102 may be homogeneous or heterogeneous. A typical node 102 may be a computing device executing an operating system such as LINUX®, WINDOWS®, or the like.

As one example, some or all of the nodes 102 may include one or more DAS SSDs, as discussed above with respect to FIG. 1, for storing user data and/or system data, and which may be subject to reclamation processing of unused storage. Additionally, or alternatively, as another example, some or all of the nodes 102 may access a thin provisioning array, as discussed above with respect to FIG. 1, for storing user data and/or system data, and which may be subject to reclamation processing of unused storage.

The plurality of nodes 102 provide the system 300 that can be scaled from a few storage nodes 102 to many nodes 102 able to store thousands of terabytes of data. This scalable architecture of FIG. 3 may ensure that storage capacity is able to keep pace with an organization's increasing storage requirements. In some examples, stored data may be replicated across the cluster so that the system 300 is protected from device failure. If a node 102 fails, or a storage device associated with a node 102 fails, the system 300 may automatically fail over to other nodes in the cluster that maintain replicas of the same data.

In the illustrated example, the system 300 includes the plurality of nodes 102, a plurality of network switches 302 and 304, power distribution units (PDUs) 306, and uninterruptible power supplies (UPSs) 308. In some examples, the network switch 302 may be an internal switch that enables peer-to-peer communication between the nodes 102, and the network switch 304 may be an external switch that allows extra-cluster access to each node 102, such as for communicating with client devices (not shown in FIG. 3). PDUs 206 are used to power the nodes 102 and switches 302, 304, and the UPSs 208 are used to protect and maintain power to the nodes and switches.

Although not meant to be limiting, typically a cluster is connectable to a network, such as the public Internet, an enterprise intranet, or other wide area or local area network. For instance, the system 300 may be implemented within an enterprise environment, and may be reached, for example, by navigating through a site's corporate domain name system (DNS) name server (not shown in FIG. 3). Thus, for example, the cluster's domain may be a sub-domain of an existing domain. Users may access the system 300 using any conventional interface or access tool. Thus, for example, access to the system 300 may be carried out over any IP-based protocol (HTTP, FTP, NFS, AFS, SMB, a Web service, or the like), via an API, or through any other known or later-developed access method, service, program or tool. In some examples, users may use client applications to access the system 300 through one or more types of external gateways such as standard UNIX® file protocols or HTTP APIs. Further, the system 300 may be exposed through a virtual file system that can optionally sit under any standard UNIX® file protocol-oriented facility. Examples include: NFS, FTP, SMB/CIFS, or the like.

As still another alternative, rather than being implemented in a storage node, at least a portion of the storage manager 128 and reclamation management module 130 may be implemented in a storage controller (not shown in FIG. 3) that manages a particular thin provisioned storage array, an SSD array, a DAS SSD, or other classes of storage that employ reclamation. Additionally, while several example systems have been described, numerous other systems able to implement the reclamation techniques herein will be apparent to those of skill in the art having the benefit of the disclosure herein.

Figure 4:
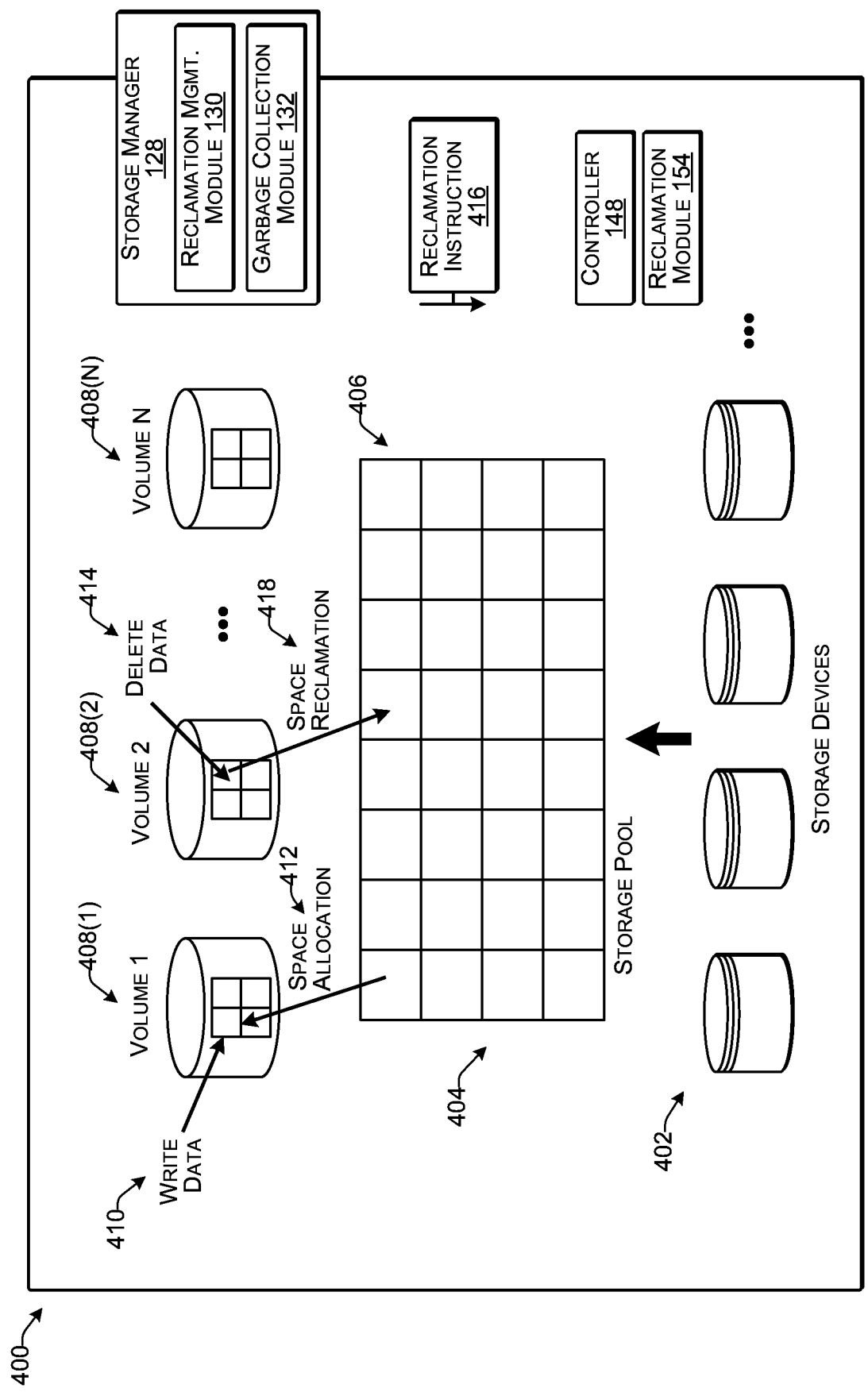
FIG. 4 illustrates an example of thin provisioning space allocation and space reclamation according to some implementations herein.

FIG. 4 illustrates an example 400 of thin provisioning space allocation and space reclamation according to some implementations herein. In this example, a plurality of storage devices 402 may make up a storage pool 404. In some cases, the storage pool 404 may include a plurality of logical units (LUs) 406 that may each have a respective individually distinguishable LUN assigned. Furthermore, the storage manager 128 may create a plurality of logical volumes 408(1), 408(2), . . . , 408(N) from the storage pool 404 that may be used by users for storing user data and/or by the system for storing system data, such as discussed above.

In this example, when the storage manager creates a volume, such as the first volume 408(1), an initial amount of storage space may be allocated to the volume. Subsequently, suppose that data is written to the first volume 408(1), as indicated at 410. In some cases, when the amount of free space remaining in the first volume 408(1) is below a threshold level, additional space may be allocated to the volume, as indicated at 412.

In addition, as indicated at 414, supposed that data is deleted from the second volume 408(2), e.g., such as in the case of a user indicating that a portion of data, e.g., a file is to be deleted. Subsequently, the garbage collection module 132 may be executed, may determine that the deleted data should be permanently deleted from the second volume 408(2), and may indicate that the corresponding storage space can be reclaimed. The storage manager 128 may determine that the freed up space is to be reclaimed, and may send a reclamation instruction 416 to the controller 148 to reclaim storage corresponding to the deleted data on the second volume 408(2). Subsequently, as indicated at 418, the reclamation module 154 may be executed by the controller to reclaim the freed up storage space, and the reclaimed storage space may be returned to the storage pool 404. For example, the reclamation module 154 may write all zeros to the virtual storage area corresponding to the deleted data. Units of storage space, such as pages, blocks, etc., having all zeros may be returned to the storage pool 404, and may be subsequently reallocated from the storage pool 404 to any of the volumes 408(1)-408(N) in an on-demand manner.

FIG. 5 illustrates an example storage profile table 500 according to some implementations. For instance, the storage profile table 500 may be maintained by the storage manager for determining when to perform reclamation on a volume. The storage profile table includes a volume ID 502, storage class 504, data characteristics 506, and available capacity 508. For instance, volume ID 502 may be the volume identifier used for distinguishing the volumes created by the storage manager. The storage class 504 may be the class of storage from which the respective volume is created, such as array thin provisioning, DAS thin provisioning, solid-state devices, or other types of storage classes that employ reclamation processing. The data characteristics 506 may be the type of data that is stored on the respective volume such as system data or user data. The available capacity 508 may indicate the amount of storage capacity of the respective volume that has not yet been used and is available for storing data. For instance, the table 500 indicates that 40 percent of the first volume is still available for storing new data.

The storage manager may generate and update the storage profile table 500 as new volumes are created by the storage manager. For example, the storage manager knows the class of storage from which each volume is created. Furthermore, the storage manager knows the category of data that is stored in each volume. In addition, the storage manager may determine the used and available capacity of each volume such as based on a comparison of the amount of data stored in each volume with the amount of total capacity of the volume. Further, the storage manager may update the storage profile table as reclamation is performed based on information received from the reclamation module, such as an amount of storage that is reclaimed. The storage manager may refer to the storage profile table 500 when determining whether to perform reclamation on a particular volume as discussed additionally below. Furthermore, while the storage profile table 500 is illustrated as a table in this example, any other type of data structure capable of maintaining the illustrated information may be used instead of, or in addition to, a table.

In addition, in some examples as discussed additionally below, individual volumes storing user data may have different used remaining capacity thresholds for invoking reclamation. For instance, reclamation may be invoked when less than 50 percent capacity is remaining for some volumes, and when less than 40 percent capacity is remaining for other volumes. In these examples, an additional column may be added to the table 500 to indicate the remaining capacity threshold for each volume storing user data.

Figure 6:
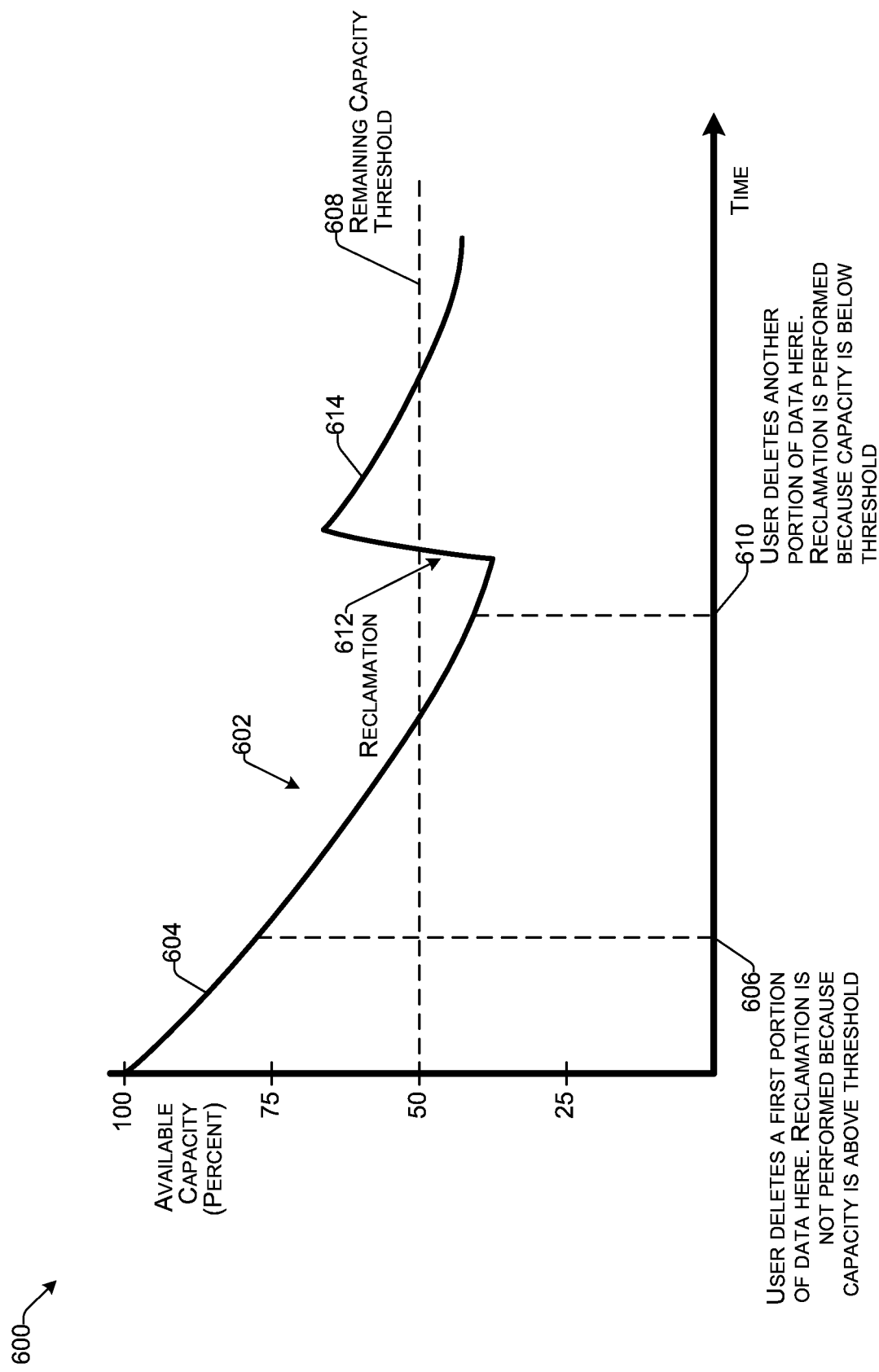
FIG. 6 illustrates an example graph showing storage capacity as a function of time according to some implementations.

FIG. 6 illustrates an example graph 600 showing storage capacity as a function of time according to some implementations. In this example, a curve 602 may represent the percentage of remaining available storage capacity of a particular volume storing user data managed by the storage manager. For example, over time, as one or more users store data to the volume, the remaining available capacity of the volume may decrease, as indicated at 604. Suppose that at a first point in time, as indicated at 606, a user deletes a first portion of data from the volume. The storage manager may subsequently compare the remaining available capacity of the volume to a remaining capacity threshold 608 to determine whether to perform reclamation on the volume. For example, a remaining capacity threshold 608 for performing reclamation may be established for all volumes storing user data in the system. Alternatively, in some examples, the remaining capacity threshold 608 may be different for different volumes storing different user data in the system. In some cases, the remaining capacity threshold 608 may be fixed unless changed or otherwise reconfigured by an administrator. In other cases, the storage manager may adjust the remaining capacity threshold 608 for particular user volumes or for all user volumes. Further, in other examples, the threshold may be based on an amount of capacity used rather than the amount of capacity remaining. As these two numbers are complimentary, either may be used in the examples herein for determining whether to perform reclamation.

Subsequently, suppose that at a later point in time, as indicated at 610, a user deletes another portion of data from the volume. Subsequently, when the storage manager examines the volume to determine whether to perform reclamation, the storage manager may determine that the available remaining capacity of the volume is below the remaining capacity threshold 608, and may further determine that data has been deleted from the volume since the last time reclamation was performed on the volume. Accordingly, the storage manager may invoke the reclamation module to perform reclamation on the volume as indicated at 612. The reclamation process in this example causes the available capacity of the volume to rise back above the remaining capacity threshold 608. Subsequently, as indicated at 614 the available capacity may again gradually decrease as additional data is stored to the volume.

Further, in some cases, the reclamation may not result in the available capacity rising back above the remaining capacity threshold 608. In such cases, the volume may be subject to reclamation each time data is deleted. To prevent frequent reclamations that provide little reclaimed storage space, some examples may include adjusting of the remaining capacity threshold 608, such as from 50 percent to 40 percent. For instance, the storage manager may monitor the amount of space being reclaimed, and if there are frequent small reclamations, the remaining capacity threshold 608 may be adjusted. However, the adjustment of the remaining capacity threshold 608 may be balanced against the need to reclaim space more aggressively from volumes that are closer to being full.

Figure 7:
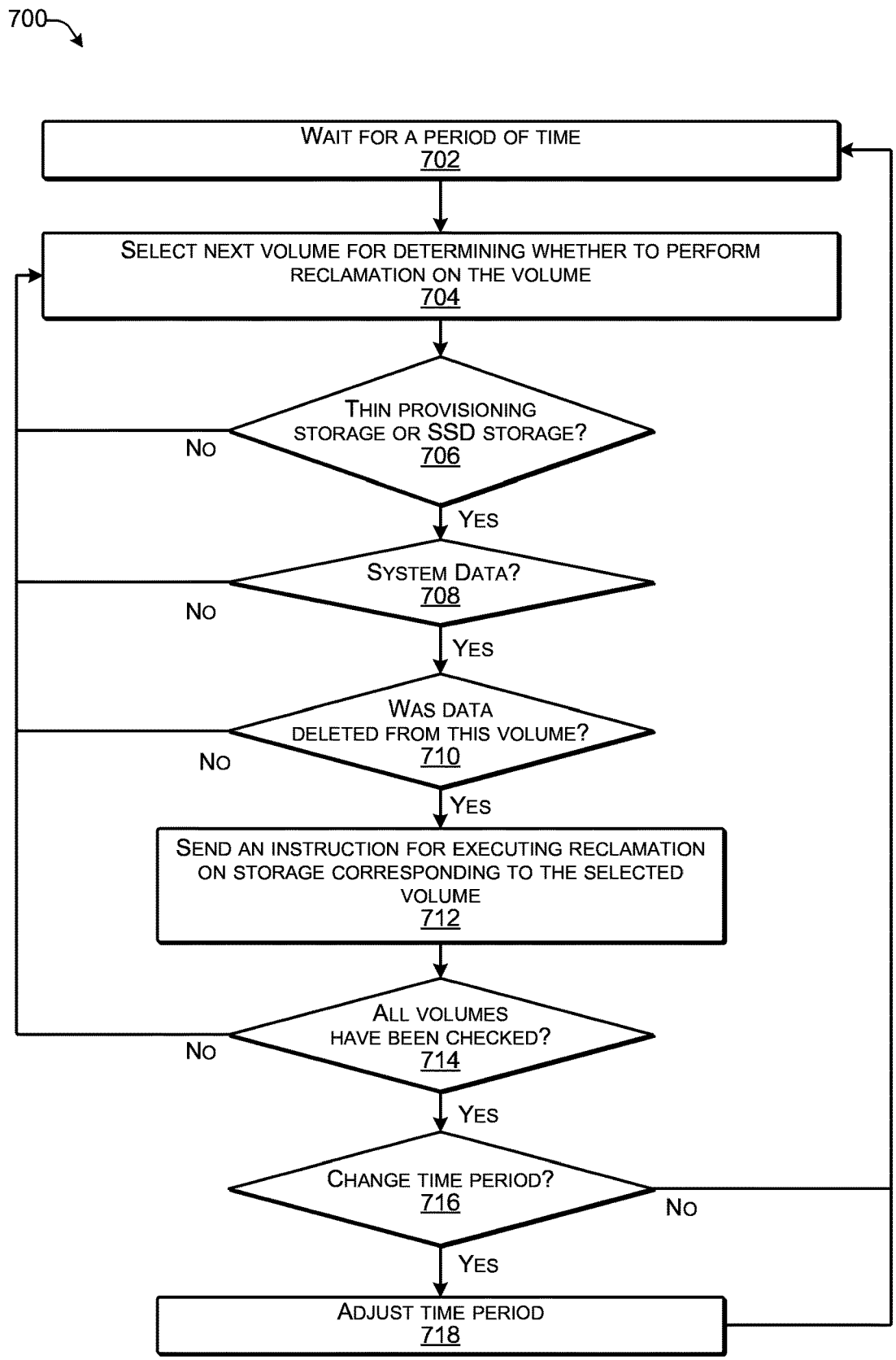
FIG. 7 is a flow diagram illustrating an example process executed for reclaiming storage space from volumes storing system data according to some implementations.
Figure 8:
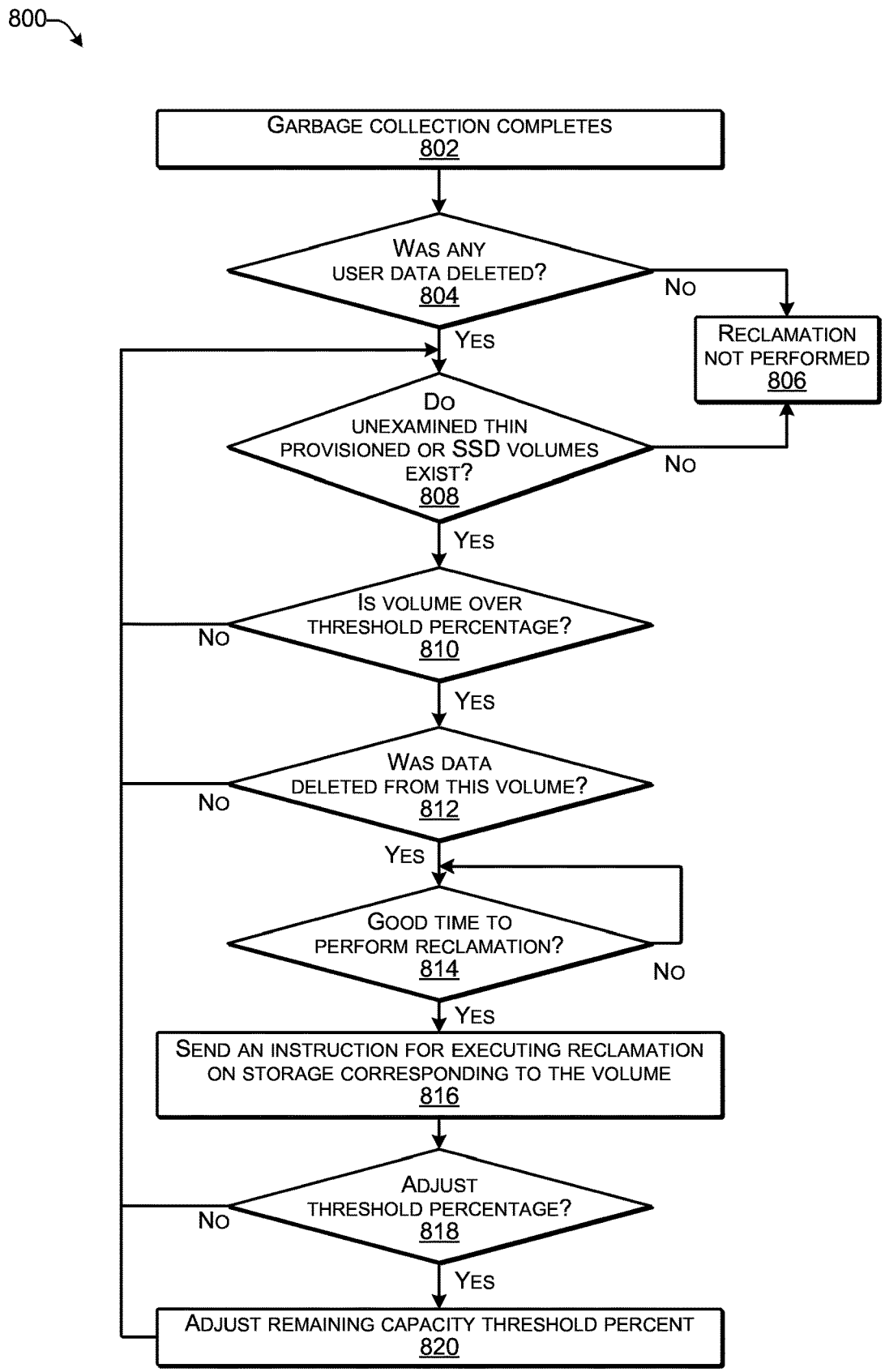
FIG. 8 is a flow diagram illustrating an example process for reclaiming storage space from volumes storing user data according to some implementations.
Figure 9:
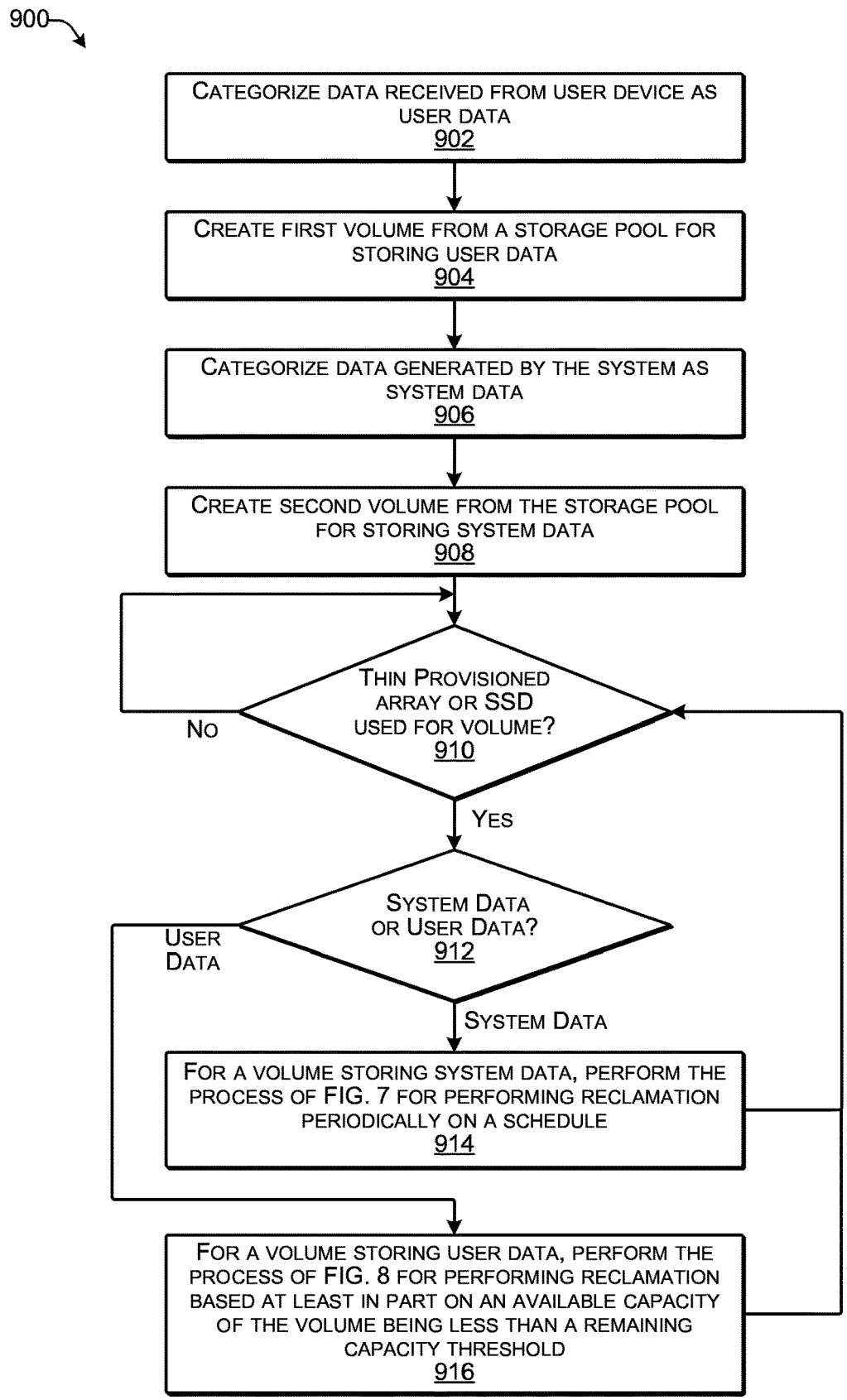
FIG. 9 is a flow diagram illustrating an example process for performing reclamation in a storage according to some implementations.

FIGS. 7-9 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

FIG. 7 is a flow diagram illustrating an example process 700 executed for reclaiming storage space from volumes storing system data according to some implementations. In some examples, the process 700 may be executed by a storage manager executing on at least one storage node or other suitable computing device.

At 702, the storage manager may wait for a period of time. For example, the storage manager may be configured to perform reclamation of unused storage freed by deletion of system data according to a schedule or periodic basis. Thus, the storage manager may be configured to wait for a specified period of time after completing the previous reclamation, or until the next scheduled time for performing reclamation arrives.

At 704, the storage manager may select a next volume for determining whether to perform reclamation on the volume. As one example, the storage manager may access the storage profile table 500 discussed above with respect reference to FIG. 5 for selecting a next volume to examine.

At 706, the storage manager may determine whether the selected volume corresponds to thin provision storage, SSD storage, or other class of storage that is configured for employing reclamation of freed storage space to enable reuse of the freed storage space. For instance, the storage manager may determine from the storage profile table 500 whether the selected volume is provided from thin provision storage, SSD storage, or other class of storage requiring reclamation. If the result is no, the process may return to block 704 for selecting the next volume. On the other hand, if the result is yes, the process may proceed to block 708.

At 708, the storage manager may determine whether the selected volume stores system data. Typically, the storage manager may store system data in separate volumes from user data. Accordingly, the storage manager may determine from the storage profile table 500 whether the selected volume stores system data or user data. If the result is no, the process may return to block 704 for selecting the next volume in the storage profile table 500. On the other hand, if the result is yes, the process may proceed to block 710.

At 710, the storage manager may determine whether data has been deleted from the selected volume. For example, the storage manager may know, e.g., from the file system, which volumes have had system data deleted. If no data has been deleted, reclamation is not performed and the process goes to block 704. On the other hand, if data has been deleted, the process goes to block 712. Furthermore, in some examples, prior to going to block 712, the storage manager may determine a user usage load on the system, and may wait to perform reclamation until the user usage load is less than a threshold load.

At 712, the storage manager may send an instruction for executing reclamation on the volume. As one example, the storage manager may send the reclamation instruction to a controller that controls storage corresponding to the volume, such as an array controller or an SSD controller. A reclamation module may be executed by the controller for performing the reclamation. For instance, in the case of an SSD, a driver for the SSD may execute a reclamation module that performs reclamation on the SSD. Alternatively, in the case of a thin provisioning array, the array controller may execute a reclamation module that may be part of a thin provisioning software stack used by the array controller for providing thin provisioned storage to the storage manager. In some examples, the reclamation be may be performed as a background process such as if the current load on the system exceeds a threshold level. For instance, the reclamation may be executed with a lower priority with respect to user events, such as user-requests to write or read data to or from the storage, respectively. As another example, if the volume corresponds to an LU on an SSD array, the corresponding storage space of the LU may be reclaimed, which in some cases, such as in the case that the array is configured in a RAID configuration, may involve performing reclamation on portions of several different physical SSD devices.

At 714, the storage manager determines whether all volumes have been checked. For example, the storage manager may traverse through the storage profile table 500 and the volumes in sequential order. When the storage manager reaches the end of the storage profile table 500, the service manager may determine that all volumes have been checked. When the result is no, the process may return to block 704 to select the next volume. On the other hand, when the result is yes, the process may proceed to block 716.

At 716, the storage manager may determine whether to change the time period between the reclamation processings. For example, the storage manager may check the amount of storage that was reclaimed by the reclamation processing and if the amount reclaimed is less than a first threshold, the storage manager may extend the period of time between reclamation processings by a specified amount. For instance, if only a small amount of storage capacity is being reclaimed during each reclamation processing, then the period of time between reclamation processing may be increased so that a larger amount of storage capacity is reclaimed and efficiency of the reclamation process may be increased. On the other hand, if the amount reclaimed is more than a second threshold, the storage manager may shorten the period of time between reclamation processing by a specified amount. In some examples, the storage manager may check the amount of storage space that was reclaimed over a plurality of recent reclamation processings when making the determination as to whether to change the period of time between reclamation processings. If the result is no, the process may return to block 702 to wait for the next scheduled reclamation processing. On the other hand, if the result is yes, the process proceeds to block 718.

At 718, the storage manager may adjust the time period until the next reclamation processing for system data. In some examples, the storage manager may adjust the time period by a specified or predetermined amount. Alternatively, in other examples, the amount of change of the time between reclamation processings may be based at least in part on by how much the amount of storage space that is reclaimed is less than the first threshold or greater than the second threshold.

FIG. 8 is a flow diagram illustrating an example process 800 for reclaiming storage space from volumes storing user data according to some implementations. In some examples, the process 800 may be executed by the storage manager executing on at least one storage node or other suitable computing device.

At 802, the storage manager receives an indication that garbage collection is complete. For example, the garbage collection module may perform garbage collection on the user data on a periodic basis or on an as-needed basis such as in the case that there are a large number of user data deletions. The garbage collection module may determine whether deleted data is to be permanently deleted from the storage system or is to be retained for a period of time based on a retention policy or the like. For instance, the retention policy may safeguard against accidental user deletion by retaining deleted data for a period of time before actually deleting the data from the storage. As another example, retention policies may apply to particular pieces of data, such as archive data, and these pieces of data may be deleted automatically by the garbage collection module when the retention period for these pieces of data expire. In some examples, garbage collection is only performed on user data, and not on system data. Further, the garbage collection may run on a schedule set by an administrator, or based on other conditions within the system, such as a number of deletions.

At 804, the storage manager determines whether any user data was deleted. For example, the garbage collection module makes the determination as to whether the data indicated to be linked deleted by the user is to be permanently deleted from the storage. If the result is no, then the process goes to block 806 and reclamation is not performed. On the other hand, if the result is yes, the process goes to block 808.

At 806, the storage manager may not perform reclamation if no user data is deleted or if no thin provisioned or SSD volumes exist.

At 808, the storage manager may determine whether any unexamined thin provisioned or SSD volumes exist, i.e., volumes whose corresponding underlying physical storage device(s) correspond to a thin provisioning array, an SSD, or other class of storage that is configured for employing reclamation of freed storage space to enable reuse of the freed storage space. For example, the storage manager may refer to the storage profile table 500 discussed above with respect to FIG. 5 for determining the class of storage for a particular volume. If there are no thin provisioned or SSD volumes that have not yet been examined the process proceeds to block 806 and reclamation is not performed. On the other hand, if there is an unexamined thin provisioned volume, SSD volume, or volume from another class of storage requiring reclamation, the process may select the volume and proceed to block 810.

At 810, the storage manager may determine whether a current remaining available capacity of the selected volume is less than the remaining capacity threshold, as discussed above, e.g., with respect to FIG. 6. For example, if the remaining capacity threshold is set at 50 percent, the storage manager may determine from the storage profile 500 whether the remaining available capacity of the selected volume is less than 50 percent. In some examples, the remaining capacity threshold may be set initially by an administrator, and may be adjusted by the storage manager, as discussed below with respect to blocks 818 and 820. If the result is no, the process may return to block 808 to select a next volume. On the other hand, if the result is yes the process may proceed to block 812.

At 812, the storage manager may determine whether data was deleted from the selected volume. For example, the storage manager may receive from the garbage collection module a list of volumes from which data was deleted during garbage collection. If no data was deleted from the selected volume, the process returns to block 808. On the other hand, if the result is yes, the process proceeds to block 814.

At 814, the storage manager may determine whether now is a good time to perform reclamation. For example, the storage manager may determine an overall user usage load on the system and may determine whether the load exceeds a threshold. If the user usage load exceeds the threshold, the storage manager may wait for a period of time until the user usage load will not exceed the threshold. In some examples, the storage manager may refer to historic user usage patterns for the system when determining the load for the system during an upcoming period of time. As one example, if a large number of users are currently logged in or otherwise using the system, and the load on the storage during such usage typically exceeds a threshold level of system use, then the load may be expected to exceed the threshold, and the reclamation may be delayed until a smaller number of users are using the system. This operation may also be performed in the process 700, such as prior executing the operation of block 712.

At 816, the storage manager may send an instruction for executing reclamation on the volume. As one example, the storage manager may send the reclamation instruction to a controller that controls storage corresponding to the volume, such as an array controller or an SSD controller. A reclamation module may be executed by the controller for performing the reclamation. For instance, in the case of an SSD, a driver for the SSD may execute a reclamation module that performs reclamation on the SSD. Alternatively, in the case of a thin provisioning array, the array controller may execute a reclamation module that may be part of a thin provisioning software stack used by the array controller for providing thin provisioned storage to the storage manager. In some examples, the reclamation be may be performed as a background process such as if the current load on the system exceeds a threshold level. For instance, the reclamation may be executed with a lower priority with respect to user events, such as user-requests to write or read data to or from the storage, respectively. As another example, if the volume corresponds to an LU on an SSD array, the corresponding storage space of the LU may be reclaimed, which in some cases, such as in the case that the array is configured in a RAID configuration, may involve performing reclamation on portions of several different physical SSD devices.

At 818, the storage manager may determine whether to adjust the remaining capacity threshold used in block 810. For example, as discussed above with respect to FIG. 6, the remaining capacity threshold may be adjusted if the volume capacity is less than 50 percent full and the reclamation consistently results in a small amount of storage space being reclaimed. For instance, the remaining capacity threshold may be adjusted to 40 percent or 30 percent, etc., to possibly reduce the frequency of small reclamation returns. If the result is no, the process returns to block 808. On the other hand, if the result is yes, the process goes to block 820. In some examples, the determination may be made based upon the amount of storage reclaimed in the volume over a plurality of recent reclamation processings.

At 820, the storage manager may adjust the remaining capacity threshold used in block 810 based on the amount of storage space reclaimed by the processing. For instance, the remaining capacity threshold may be adjusted to 40 percent or 30 percent, etc., to possibly reduce the frequency of small reclamation returns. As mentioned above, the adjustment of the remaining capacity threshold may be balanced against the need to reclaim storage more aggressively from volumes that are closer to being full.

FIG. 9 is a flow diagram illustrating an example process 900 for performing reclamation in a storage system according to some implementations. In some cases, the process 900 may be performed by the storage manager executing on at least one node or other suitable computing device.

At 902, the storage manager may categorize data received from a user device as user data. User data, including user metadata, may be received from the user device, such as from one or more applications executing on the user device. The user application may generate user data and/or may save the user data to the storage, such as by sending user data to the storage system. Further, in some examples, user data may include content items, such as images, documents, emails, video recordings, audio recordings, and the like. When the storage manager initially receives the user data from a user device, the storage manager may categorize the received data as user data, and may store the user data on a volume designated for user data.

At 904, the storage manager may create a first volume from a storage pool for storing user data. For example, the storage manager may create a logical volume for corresponding to one or more LUs and/or one or more physical storage devices or portions thereof.

At 906, the storage manager may categorize data generated by the system as system data. Examples of system data may include system logs, transaction logs, indexes, internal databases, system generated data structures, operating system data, lists of users, and other data generated by system modules and components.

At 908, the storage manager may create a second volume from the storage pool for storing system data. For example, the storage manager may create a separate logical volume for storing system data. Thus, system data may be stored in separate volumes from user data.

At 910, the storage manager may determine whether a thin provisioning array, an SSD, or other class of storage that is configured for employing reclamation of freed storage space to enable reuse of the freed storage space is used for creating a volume in the system. For example, the storage manager may refer to the storage profile table 500 to determine whether there are any volumes corresponding to LUs on thin provisioning arrays or SSDs currently being used. If there is none being used in the system, the process waits until such a volume is created. On the other hand, if one or more such volumes are being used, the process proceeds to block 904.

At 912, the storage manager determines whether the selected volume is used to store system data or user data. For example, the storage manager may refer to the storage profile table 500 to determine the category of data being stored in the selected volume.

At 914, for volumes storing system data, the storage manager may perform the process of FIG. 7 periodically on a schedule. For example, storage manager may invoke the reclamation process on volumes storing system data on a regular basis such as every hour, every half-day, every day, or the like. As one example, the reclamation process may be performed on a daily basis late at night and/or early in the morning when there are few users using the system. Further, in some cases, the storage manager may take a current and predicted overall system load into consideration when determining when to perform reclamation.

At 916, for volumes storing user data, the storage manager may perform the process of FIG. 8 for performing reclamation based at least in part on an available capacity of the volume being less than a remaining capacity threshold. For example, if there are no thin provisioned or SSD volumes storing user data in the system, it is not necessary to execute the process of FIG. 8 following garbage collection. Further, in some cases, the storage manager may take a current and predicted overall system load into consideration when determining when to perform reclamation.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a plurality of hard disk drives and solid state drives as storage devices configured to provide a storage pool including a plurality of logical units for a thin provisioning storage that is configured for employing reclamation of freed storage space to enable reuse of the freed storage space;
one or more processors coupled to the plurality of storage devices, the one or more processors programmed by executable instructions to perform operations comprising:
establishing two different categories of data for the thin provisioning storage, the two different categories comprising a user data category and a system data category, wherein user data is received at least in part from a user device and system data is generated at least in part by the system;
creating at least one user data volume corresponding to at least one first allocation of the thin provisioning storage, wherein the at least one user data volume is categorized for storing the user data;
creating at least one system data volume corresponding to at least one second allocation of the thin provisioning storage, wherein the at least one system data volume is categorized for storing the system data and is separate from the at least one user data volume;
establishing a different storage reclamation procedure for each of the two different categories of data, wherein a first storage reclamation procedure for the user data category includes performing reclamation on the at least one user data volume based on determining that an available capacity of the at least one user data volume is less than a remaining capacity threshold, wherein a second storage reclamation procedure for the system data category includes performing reclamation on the at least one system data volume based on determining that a specified period of time has elapsed since a last reclamation was performed on the system data volume;
categorizing received or generated data to be stored in the thin provisioning storage as either user data for storage in the at least one user data volume or system data for storage in the at least one system data volume;
determining whether a first volume has been categorized as a system data volume or a user data volume;
prior to performing the first storage reclamation procedure or the second storage reclamation procedure, determining a user usage load on the system during an upcoming time period based in part on determining a number of users currently logged in to the system and based in part on a historic load for the number of users currently logged in;
based on determining that the first volume has been categorized as one of the at least one user data volume for storing user data, based on determining that the user usage load on the system during the upcoming time period is less than a user load threshold, and based on determining that a portion of the user data has been deleted from the first volume, performing the first storage reclamation procedure by determining whether an available capacity of storage allocated to the first volume is less than the remaining capacity threshold; and
based at least in part on determining that the available capacity of the thin provisioning storage allocated to the first volume is less than the remaining capacity threshold, sending an instruction to a controller associated with the thin provisioning storage for performing reclamation on the thin provisioning storage allocated to the first volume and corresponding to the portion of the user data deleted from the first volume, wherein the controller is programmed to perform reclamation on a virtual storage area including one or more of the logical units corresponding to the deleted user data in the storage pool provided by the thin provisioning storage and perform reclamation on one or more portions of one or more solid state drives corresponding to the virtual storage area.

2. The system as recited in claim 1, the operations further comprising:
based on determining that a second volume has been categorized as one of the at least one system data volume for storing system data, and based on determining that a period of time has elapsed since reclamation of freed storage space on the second volume, sending an instruction for performing the second storage reclamation procedure on storage allocated to the second volume.

3. The system as recited in claim 2, the operations further comprising:
determining that a quantity of storage space reclaimed from one or more volumes, including the second volume, categorized for storing system data, exceeds a threshold amount; and
decreasing the specified period of time for waiting until performing a next reclamation on the one or more volumes storing system data.

4. The system as recited in claim 1, the operations further comprising determining that the portion of the user data has been deleted from the first volume by performing garbage collection on the first volume, wherein performing garbage collection comprises:
determining that an indication has been received from the user device indicating that the portion of the user data is to be deleted from the first volume;
determining that a data retention policy indicates that the portion of the user data is able to be deleted from the first volume; and
based on determining that an amount of storage capacity reclaimed on the thin provisioning storage allocated to the first volume is less than a reclamation threshold amount, changing the remaining capacity threshold for the first volume to a lower remaining capacity threshold for the first volume for reducing a frequency of reclamation.

5. The system as recited in claim 1, the operations further comprising performing the reclamation on the one or more portions of the one or more solid state drives corresponding to the virtual storage area by overwriting the one or more portions of the one or more solid state drives corresponding to the virtual storage area with a pattern associated with unused storage space.

6. The system as recited in claim 1, wherein:
the thin provisioning storage is configured as a thin provisioning array that includes both the hard disk drives and the solid state drives; and
the thin provisioning array is configured to provide storage capacity to the first volume based at least in part on demand.

7. The system as recited in claim 1, the operations further comprising:
receiving initially, by the one or more processors, the user data, at least in part, from an application executing on the user device, for storage on the storage devices; and
based at least in part on the receiving, categorizing the received user data as the user data.

8. The system as recited in claim 1, the operations further comprising generating, by the one or more processors, the system data, wherein the system data comprises at least one of operating system data, a log generated by the one or more processors, or an index generated by the one or more processors.

9. A method comprising:
establishing, by a system including one or more processors programmed with executable instructions, for a thin provisioning storage that is configured for employing reclamation of freed storage space to enable reuse of the freed storage space, two different categories of data for the storage, the two different categories comprising a user data category and a system data category, wherein user data is received at least in part from a user device and system data is generated at least in part by the system, wherein the thin provisioning storage includes a plurality of hard disk drives and solid state drives as storage devices configured to provide a storage pool including a plurality of logical units;
creating at least one user data volume corresponding to at least one first allocation of the thin provisioning storage, wherein the at least one user data volume is categorized for storing the user data;
creating at least one system data volume corresponding to at least one second allocation of the thin provisioning storage, wherein the at least one system data volume is categorized for storing the system data and is separate from the at least one user data volume;
establishing a different storage reclamation procedure for each of the two different categories of data, wherein a first storage reclamation procedure for the user data category includes performing reclamation on the at least one user data volume based on determining that an available capacity of the at least one user data volume is less than a remaining capacity threshold, wherein a second storage reclamation procedure for the system data category includes performing reclamation on the at least one system data volume based on determining that a specified period of time has elapsed since a last reclamation was performed on the system data volume;
categorizing received or generated data to be stored in the thin provisioning storage as either user data for storage in the at least one user data volume or system data for storage in the at least one system data volume;
prior to performing the first storage reclamation procedure or the second storage reclamation procedure, determining a user usage load on the system during an upcoming time period based in part on determining a number of users currently logged in to the system and based in part on a historic load for the number of users currently logged in;
based on determining that a first volume has been categorized as one of the at least one user data volume for storing user data, based on determining that the user usage load on the system during the upcoming time period is less than a user load threshold, and based on determining that a portion of the user data has been deleted from the first volume, performing the first storage reclamation procedure by determining, by the one or more processors, whether an available capacity of storage allocated to the first volume is less than the remaining capacity threshold; and
based at least in part on determining that the available capacity of the thin provisioning storage allocated to the first volume is less than the remaining capacity threshold, sending, by the one or more processors, an instruction to a controller associated with the thin provisioning storage for performing reclamation on the thin provisioning storage allocated to the first volume and corresponding to the portion of the user data deleted from the first volume, wherein the controller is programmed to perform reclamation on a virtual storage area including one or more of the logical units corresponding to the deleted user data in the storage pool provided by the thin provisioning storage and perform reclamation on one or more portions of one or more solid state drives corresponding to the virtual storage area.

10. The method as recited in claim 9, further comprising: based on determining that a second volume has been categorized as one of the at least one system data volume for storing system data, and based on determining that a period of time has elapsed since reclamation of freed storage space on the second volume, sending an instruction for performing the second storage reclamation procedure on storage allocated to the second volume.

11. One or more non-transitory computer-readable media storing instructions that, when executed by one or more processors, program the one or more processors to:
establish, for a system including a thin provisioning storage that is configured for employing reclamation of freed storage space to enable reuse of the freed storage space, two different categories of data for the storage, the two different categories comprising a user data category and a system data category, wherein user data is received at least in part from a user device and system data is generated at least in part by the system, wherein the thin provisioning storage includes a plurality of hard disk drives and solid state drives as storage devices configured to provide a storage pool including a plurality of logical units;
create at least one user data volume corresponding to at least one first allocation of the thin provisioning storage, wherein the at least one user data volume is categorized for storing the user data;
create at least one system data volume corresponding to at least one second allocation of the thin provisioning storage, wherein the at least one system data volume is categorized for storing the system data and is separate from the at least one user data volume;
establish a different storage reclamation procedure for each of the two different categories of data, wherein a first storage reclamation procedure for the user data category includes performing reclamation on the at least one user data volume based on determining that an available capacity of the at least one user data volume is less than a remaining capacity threshold, wherein a second storage reclamation procedure for the system data category includes performing reclamation on the at least one system data volume based on determining that a specified period of time has elapsed since a last reclamation was performed on the system data volume;
categorize received or generated data to be stored in the thin provisioning storage as either user data for storage in the at least one user data volume or system data for storage in the at least one system data volume;
prior to performing the first storage reclamation procedure or the second storage reclamation procedure, determining a user usage load on the system during an upcoming time period based in part on determining a number of users currently logged in to the system and based in part on a historic load for the number of users currently logged in;
based on determining that a first volume has been categorized as one of the at least one user data volume for storing user data, based on determining that the user usage load on the system during the upcoming time period is less than a user load threshold, and based on determining that a portion of the user data has been deleted from the first volume, perform the first storage reclamation procedure to determine whether an available capacity of storage allocated to the first volume is less than the remaining capacity threshold; and
based at least in part on determining that the available capacity of the thin provisioning storage allocated to first volume is less than the remaining capacity threshold, send an instruction to a controller associated with the thin provisioning storage for performing reclamation on the thin provisioning storage allocated to the first volume and corresponding to the portion of the user data deleted from the first volume, wherein the controller is programmed to perform reclamation on a virtual storage area including one or more of the logical units corresponding to the deleted user data in the storage pool provided by the thin provisioning storage and perform reclamation on one or more portions of one or more solid state drives corresponding to the virtual storage area.

12. The one or more non-transitory computer-readable media as recited in claim 11, wherein the one or more processors are further programmed to:
based on determining that a second volume has been categorized as one of the at least one system data volume for storing system data, and based on determining that a period of time has elapsed since reclamation of freed storage space on the second volume, send an instruction for performing the second storage reclamation procedure on storage allocated to the second volume.

13. The one or more non-transitory computer-readable media as recited in claim 12, wherein the one or more processors are further programmed to:
determine that a quantity of storage space reclaimed from one or more volumes, including the second volume categorized for storing system data, exceeds a threshold amount; and
decrease the specified period of time for waiting until performing a next reclamation on the one or more volumes storing system data.

14. The one or more non-transitory computer-readable media as recited in claim 11, wherein the one or more processors are further programmed to determine that the portion of the user data has been deleted from the first volume by performing garbage collection on the first volume, wherein performing garbage collection comprises:
determining that an indication has been received from the user device indicating that the portion of the user data is to be deleted from the first volume; and
determining that a data retention policy indicates that the portion of the user data is able to be deleted from the first volume.

15. The one or more non-transitory computer-readable media as recited in claim 11, wherein the one or more processors are further programmed to perform the reclamation on the one or more portions of the one or more solid state drives corresponding to the virtual storage area by overwriting the one or more portions of the one or more solid state drives corresponding to the virtual storage area with a pattern associated with unused storage space.

16. The one or more non-transitory computer-readable media as recited in claim 11, wherein the one or more processors are further programmed to, based on determining that an amount of storage capacity reclaimed on the thin provisioning storage allocated to the first volume is less than a reclamation threshold amount, change the remaining capacity threshold for the first volume to a lower remaining capacity threshold for the first volume for reducing a frequency of reclamation.

* * * * *